United States Patent
Sundaralingam et al.

(10) Patent No.: US 10,050,652 B2
(45) Date of Patent: Aug. 14, 2018

(54) DEVICE AND METHOD FOR ENHANCING INTERFERENCE REJECTION BY TREATING SEPARATED SIGNAL STREAMS AS DIVERSITY BRANCHES

(71) Applicant: Provenance Asset Group LLC, Essex, CT (US)

(72) Inventors: Sathiaseelan Sundaralingam, Camberley (GB); Olli Juhani Piirainen, Oulu (FI)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 15/303,291

(22) PCT Filed: Apr. 11, 2014

(86) PCT No.: PCT/EP2014/057338
§ 371 (c)(1),
(2) Date: Oct. 11, 2016

(87) PCT Pub. No.: WO2015/154816
PCT Pub. Date: Oct. 15, 2015

(65) Prior Publication Data
US 2017/0041033 A1 Feb. 9, 2017

(51) Int. Cl.
*H04B 1/10* (2006.01)
*H04W 88/08* (2009.01)

(52) U.S. Cl.
CPC ............ *H04B 1/1081* (2013.01); *H04B 1/10* (2013.01); *H04W 88/08* (2013.01)

(58) Field of Classification Search
CPC ........ H04B 1/10; H04B 1/1081; H04W 88/08
See application file for complete search history.

(56) References Cited

U.S. PATENT DOCUMENTS

| | | | | |
|---|---|---|---|---|
| 6,539,202 | B1* | 3/2003 | Yamashita | H04B 1/109 455/24 |
| 2002/0141518 | A1* | 10/2002 | Piirainen | H04B 1/123 375/346 |
| 2003/0063596 | A1* | 4/2003 | Arslan | H04L 25/03006 370/347 |
| 2004/0022311 | A1* | 2/2004 | Zerbe | H04L 25/03038 375/229 |
| 2006/0240795 | A1* | 10/2006 | He | H04L 25/03006 455/296 |
| 2010/0165892 | A1* | 7/2010 | Cha | H04W 24/00 370/280 |
| 2011/0319044 | A1 | 12/2011 | Bornazyan | 455/233.1 |
| 2012/0002567 | A1* | 1/2012 | Sun | H04W 28/16 370/252 |

(Continued)

FOREIGN PATENT DOCUMENTS

EP  0 704 986 A2  4/1996
EP  1 009 100 A2  6/2000

*Primary Examiner* — Devan Sandiford
(74) *Attorney, Agent, or Firm* — Dinsmore & Shohl LLP

(57) ABSTRACT

An apparatus and a method are provided. The solution includes controlling the reception of a signal; dividing the received signal into a predetermined number of signal streams including the same information; applying a linear process to each signal stream, the processes having different frequency characteristics for each stream; applying a shared interference rejection over the signal streams.

19 Claims, 3 Drawing Sheets

(56) References Cited

U.S. PATENT DOCUMENTS

| | | | |
|---|---|---|---|
| 2014/0016943 A1* | 1/2014 | Caplan | H04B 10/677 398/140 |
| 2014/0064106 A1* | 3/2014 | Balraj | H04W 24/10 370/252 |
| 2014/0323076 A1* | 10/2014 | Kintis | H04B 1/1036 455/307 |

* cited by examiner

DEVICE AND METHOD FOR ENHANCING INTERFERENCE REJECTION BY TREATING SEPARATED SIGNAL STREAMS AS DIVERSITY BRANCHES

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In communication systems and in wireless systems in particular, the design of data transmission is a challenging task. The data transmission may be impaired by several factors, such as fast and slow fading, multipath propagation, interference from other systems and interference from other users within the same system.

Several receiver algorithms have been designed to meet the challenges of wireless telecommunication systems. A receiver of a wireless system must be able to capture and demodulate the transmitted signal as efficiently as possible. For environments where interference is present, interference suppression methods have been developed. An example of such a method is Interference Rejection Combiner, which is an efficient method in applications where multiple transmission paths are utilized in the transmission of signals. An example of such utilization is the use of multiple antennas. However, increasing the number of antennas may lead to significant increase in hardware costs or limiting capacity.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to: control the reception of a signal; divide the received signal into a predetermined number of signal streams comprising the same information; apply a linear process to each signal stream, the processes having different frequency characteristics for each stream; apply a shared interference rejection over the signal streams.

According to an aspect of the present invention, there is provided a method, comprising: controlling the reception of a signal; dividing the received signal into a predetermined number of signal streams comprising the same information; applying a linear process to each signal stream, the processes having different frequency characteristics for each stream; applying a shared interference rejection over the signal streams.

LIST OF DRAWINGS

In the following the invention will be described in greater detail by means of preferred embodiments with reference to the attached [accompanying] drawings, in which FIG. 1 illustrates an example of a communication environment;

DESCRIPTION OF EMBODIMENTS

Figure 1:
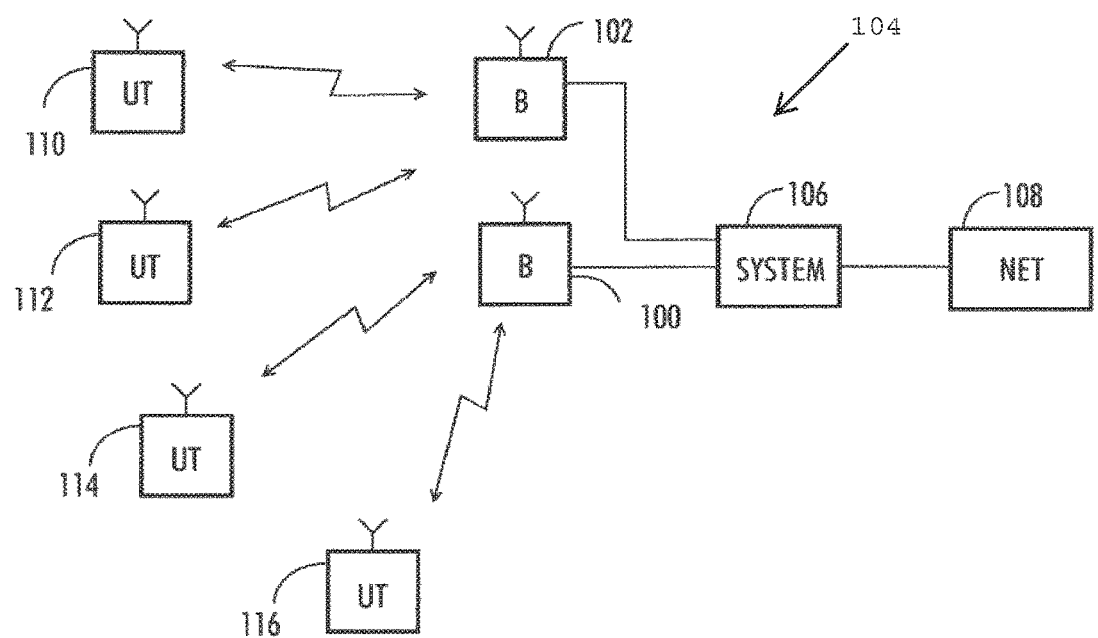

FIG. 1 illustrates an example of a communication environment in which embodiments of the invention may be applied. FIG. 1 shows two base stations 100, 102 connected to the infrastructure of the network 104. The network may be a GSM (Global System for Mobile Communications) based network, for example. However, embodiments of the invention are not limited to GSM networks. The base stations may be connected to other networks such as the Internet 108 via the infrastructure 104.

In the example of FIG. 1, user terminals 110, 112 are connected to the base station 102 and user terminals 114, 116 to the base station 100. The connections between the base stations and the user terminals are typically bi-directional. A bi-directional connection comprises a downlink (base station to user terminal) and an uplink (user terminal to base station) connection. The multiple access and modulation methods used on uplink and downlink may be different or similar, depending on system parameters.

Especially in wireless communications systems interference is an important factor which is limiting the capacity and quality of communication. Interference impairing a connection may arise from the other connections within the same system or from other nearby systems. Usually there are more than one networks or systems co-existing on the same geographical area. As new systems are being taken into use the available frequency resources are limited. For example, a given frequency spectrum may have been allocated to an operator on a given area. The operator may have been using the spectrum for a GSM based service. When the operator installs an additional system utilising LTE, for example, the same frequency spectrum is divided between the access methods and the spectrum available for GSM is smaller. This a situation may arise where the 200 kHz GSM channels will have to be spaced more tightly or frequency reuse between nearby base stations is tightened leading to increase in adjacent and co-channel interference. This leads to a need for efficient interference rejection solutions.

Interference rejection methods typically apply a noise whitening matrix which is created from the received signal filtered by a low pass FIR (finite impulse response) filter optimised for the characteristics of the signal presence in the entire bandwidth. The noise whitening matrix is normally fixed. Following domains contribute to the noise whitening matrix: 1) Temporal domain which represents the correlation between time domain samples or alternatively frequency domain orthogonal subbands (used in the LTE). 2) Spatial domain which represents the correlation between antennas. 3) IQ domain which represents the correlation between real and imaginary samples. The above three domains 1, 2 and 3 are processed jointly to maximise interference rejection gains.

To improve interference rejection gain the dimension of noise whitening matrix should be extended. One way of realizing this is for example by adding additional receiver antennas. This increases the dimensions but at the same time a significant increase in hardware costs occurs.

In an embodiment, the dimension of noise whitening matrix is expanded efficiently by dividing received signal to separate signal streams which may or may not be orthogonal to each other. The streams are treated as separate diversity branches for receiver processing and interference rejection is calculated over all the streams.

Figure 2:
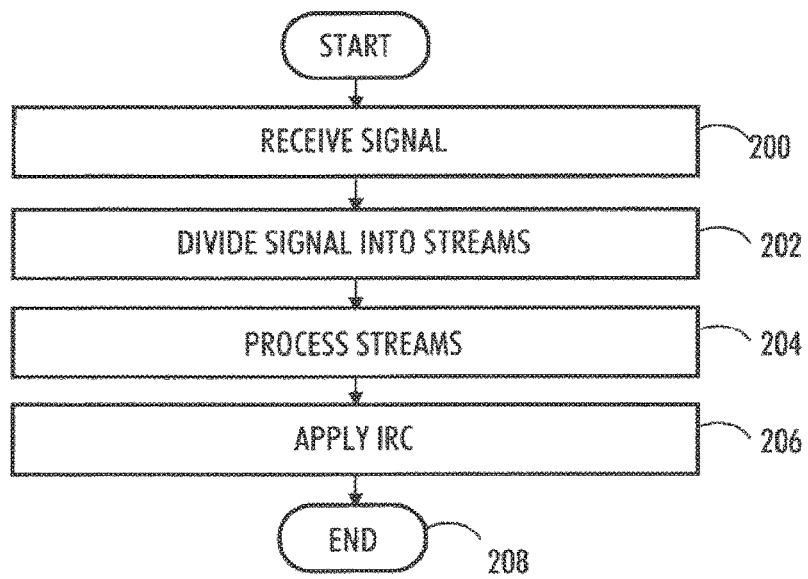
FIG. 2 is a flowchart illustrating an example of an embodiment.

FIG. 2 is a flowchart illustrating a simple example of an embodiment. The example illustrates the operation of a controller of a receiver of a communication system. The receiver may be a user terminal or a base station.

In step 200, the controller controls the reception of a signal from a transmitter.

In step 202, the controller divides the received signal into a predetermined number of signal streams comprising the same information.

In step 204, the controller applies a linear process to each signal stream, the processes having different frequency characteristics for each stream. The linear process may be filtering, for example. The filters applied to different streams may have different frequency characteristics.

In step 206, the controller applies a shared interference rejection over the signal streams.

The process ends in step 208.

The proposed solution improves the interference rejection capabilities for receivers. The solution may be implemented in base station receivers to enhance interference rejection capabilities of the receiver. Likewise, the solution may be implemented in user terminals to introduce interference rejection (especially for adjacent channel interference). The solution may be used also in receiver applying 8PSK (phase shift keying) and when a single receiver antenna is used.

The proposed solution introduces another domain to the noise whitening matrix. The solution does not require new hardware in the receiver. That frequency domain introduced by the linearly processed signal streams bring extra dimension for the noise whitening matrix and increase the interference rejection gain compared to current noise whitening matrices based on space, time and I&Q domains.

Figure 3:
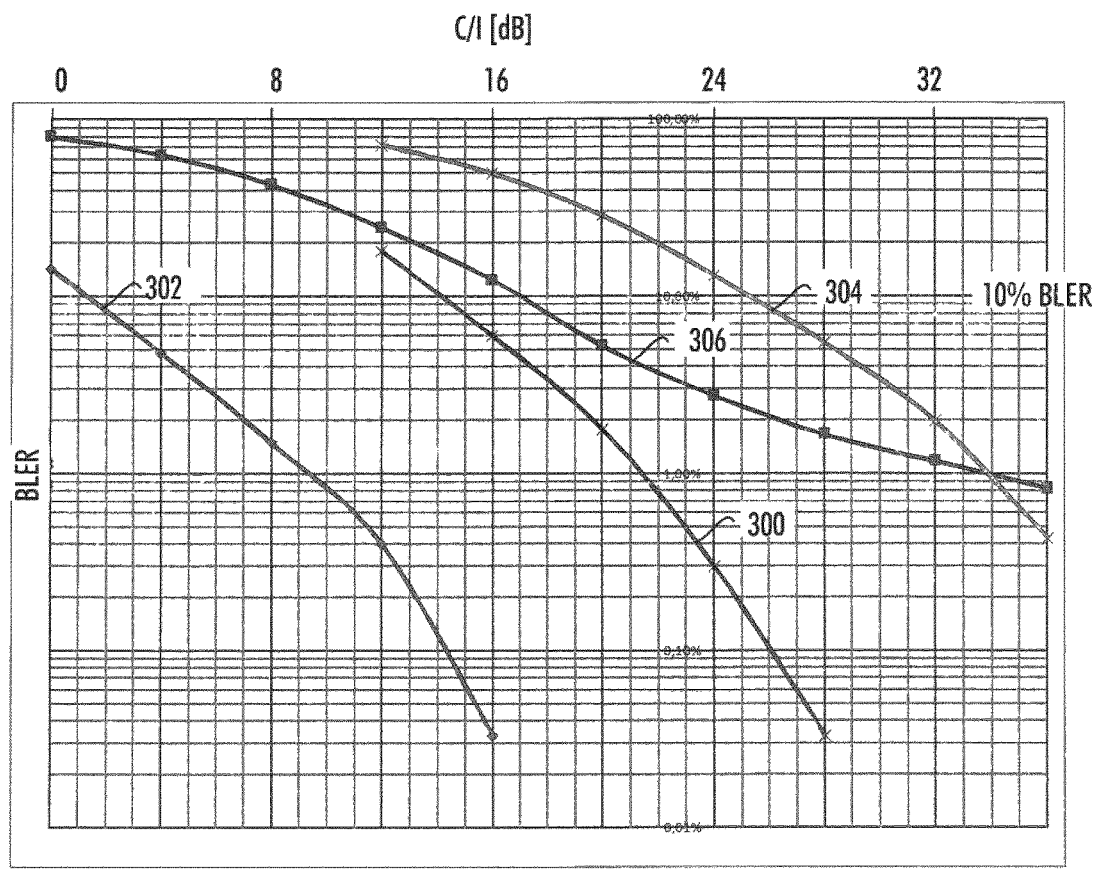
FIG. 3 illustrates a simulated example.

FIG. 3 illustrates a simulated example when an 8PSK coded signal which is received with two receiver antennas is divided into two linearly processed signal streams. The example illustrates the performance of two different modulation and coding schemes (MSC) with and without the usage of the proposed solution when co-channel interference is present. Line 300 illustrates a MSC-5 reference signal and line 302 MSC-5 signal with two signal streams. As can be seen, the performance is increased about 12 dB at 10% Block Error Rate (BLER). Line 304 illustrates a MSC-9 reference signal and line 306 MSC-9 signal with two signal streams. The performance is likewise increased by 10 dB at 10% BLER.

Figure 4A:
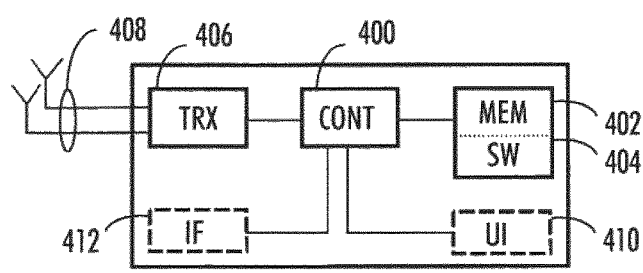
FIGS. 4A and 4B illustrate examples of apparatuses employing embodiments of the invention.

FIG. 4A illustrates an embodiment. The figure illustrates a simplified example of an apparatus in which embodiments of the invention may be applied. In some embodiments, the apparatus may be user equipment, user device or user terminal or a part of it capable communicating with a base station. In some embodiments, the apparatus may be a base station or a part of it capable communicating with and controlling user terminals.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 400 configured to control at least part of the operation of the apparatus. The control circuitry 400 is configured to execute one or more applications.

The apparatus may comprise a memory 402 for storing data or applications. Furthermore the memory may store software 404 executable by the control circuitry 400. The memory may be integrated in the control circuitry.

The apparatus comprises at least one transceiver 406. The transceiver is operationally connected to the control circuitry 400. It may be connected to an antenna arrangement 408 comprising one or more antenna elements or antennas.

The software 404 may comprise a computer program comprising program code means adapted to cause the control circuitry 400 of the apparatus to control a transceiver 406. With the at least one transceiver, the apparatus is capable of communicating wirelessly with a base station (in case of a user terminal) or with a user terminal (in case of a base station).

In an embodiment, the apparatus may further comprise user interface 410 operationally connected to the control circuitry 400. The interface may comprise a (touch sensitive) display, a keypad, a microphone, and a speaker, for example. This applies especially when the apparatus is a user terminal.

In an embodiment, the apparatus may further comprise an interface 412 operationally connected to the control circuitry 400. This applies especially when the apparatus is a base station. The apparatus may communicate with other network elements using the interface.

In an embodiment, the applications may cause the apparatus at least to control the reception of a signal; divide the received signal into a given number of signal streams comprising the same information; apply a linear process to each signal stream, the processes having different frequency characteristics for each stream; and apply a common interference rejection over the signal streams.

Figure 4B:
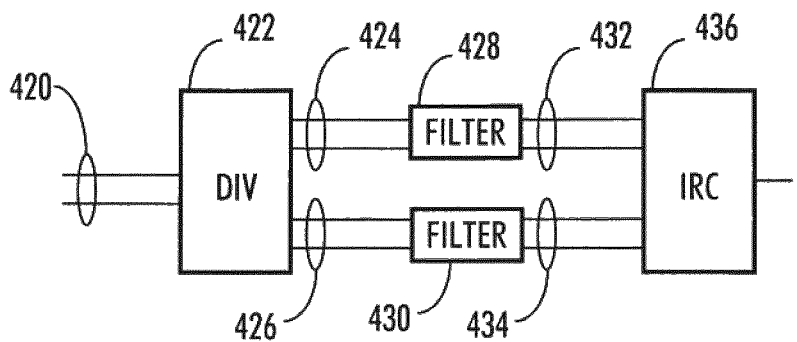

FIG. 4B illustrates an example of an apparatus employing embodiments of the invention. The apparatus may be a part of a receiver, for example. As an input signals 420 are received. The signals in this example comprise two branches, each branch received with an antenna or antenna group. Thus, two-fold diversity is achieved. The received signals are taken to a divisor 422 configured to divide the received signal into two streams 424, 426. In an embodiment, each stream is a copy of the original received signal, thus the streams comprise the same information and both original branches.

Each signal branch 424, 426 is linearly processed 428, 430. The linear process may be filtering or another linear process, each process having different frequency characteristics. The processed streams 432, 434 having different frequency characteristics are fed to an interference cancellation unit 436 where a common interference rejection is applied to the streams. The output of the interference cancellation unit 436 may be fed to an equaliser (not shown), for example.

In the above example, the diversity is increased from two to four as there are two parallel signal streams. The number of signal streams may be any other positive integer as well and not limited to two. In an embodiment, the described signal processing may be performed by the software, and therefore additional hardware is not necessarily needed.

As the signal streams have different frequency characteristics, the interference which is specific to a given stream can be cancelled more accurately when the total bandwidth is divided into smaller bands. For example, consider a single antenna 8PSK modulated signal having a modulated interference into one side of the spectrum. Applying a two stream reception in this case may lead to a gain in the order of 8 dB compared to a conventional receiver.

Figure 5:
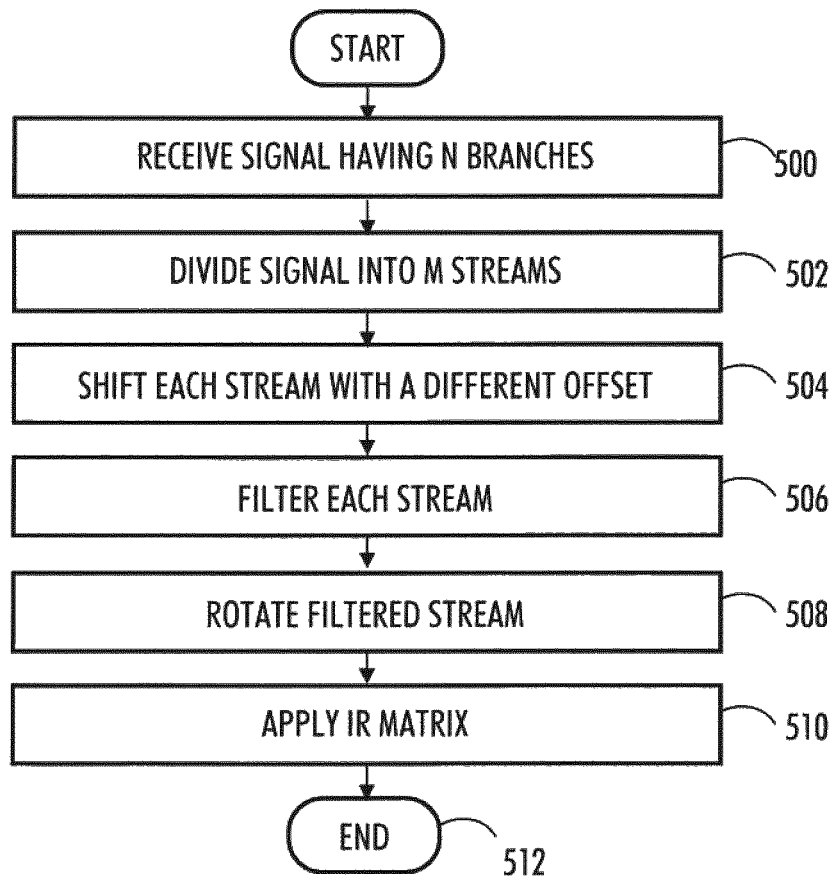
FIG. 5 is a flowchart illustrating an example.

FIG. 5 is a flowchart illustrating an example. The example illustrates the operation of a controller of a receiver of a communication system. The receiver may be the controller of a user terminal or a base station, for example.

In step 500, a signal comprising a given number N of diversity branches is received as an input. N is a positive integer.

In step 502, the received signal is divided into M streams each comprising the N diversity branches, where M is a positive integer.

In step 504, each stream is shifted with a different frequency offset $f_{offset}$. If the system is GSM, an example of a frequency offset is +/−110 KHz However, this is merely a non-limiting example. Other offset values may be used as well.

In step 506, a filter is applied to each stream.

In step 508, filtered streams are rotated. In an embodiment, samples y(i) of a stream are multiplied with an exponent operator as follows:

$$z(i)=y(i)*\exp(1*2*\pi*f_{offset}SR/SPS)$$

where z(i) is rotated time domain samples, y(i)=samples of a stream, $f_{offset}$=amount of frequency offset (in Hz) applied, SR is the symbol rate, SPS is samples per symbol or oversampling rate of the samples. For example, for a GSM signal the symbol rate equals to 270833.33 symbols per second.

In step 510, the same (N×M)×(N×M) noise whitening matrix is applied to the diversity streams.

The process ends in step 512.

Thus in an embodiment, signal streams are shifted by a frequency offset and filtered with a filter. The filter may have the same response having a centre frequency shifted on the basis of the offset of each stream. In an embodiment, the filters may be different for each stream.

In another embodiment, the signal streams are not shifted but each stream is filtered by a filter having different frequency characteristics.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor; and
at least one memory including computer program code,
the at least one memory and the computer program code configured to, with the at least one processor, cause the apparatus at least to:
control the reception of a signal as a received signal;
divide the received signal into a predetermined number of signal streams comprising the same information;
apply a linear process to each signal stream to create processed signal streams, the processes having different frequency characteristics for each stream; and
apply a shared interference rejection comprising a noise whitening matrix over the processed signal streams.

2. The apparatus of claim 1, wherein the linear processes are filters and a different filter is applied to each signal stream.

3. The apparatus of claim 1, wherein the linear processes are one of nonorthogonal and orthogonal to each other.

4. The apparatus of claim 1, wherein the apparatus is one of a base station transceiver, a user terminal, and a GSM (Global System for Mobile Communications) transceiver.

5. A method, comprising:
controlling the reception of a signal as a received signal;
dividing the received signal into a predetermined number of signal streams comprising the same information;
applying a linear process to each signal stream to create processed signal streams, the processes having different frequency characteristics for each stream; and
applying a shared interference rejection comprising a noise whitening matrix over the processed signal streams.

6. The method of claim 5, wherein the linear processes are filters, the method further comprising: applying a different filter to each signal stream.

7. The method of claim 5, wherein the linear processes are one of nonorthogonal and orthogonal to each other.

8. An apparatus, comprising:
at least one processor; and
at least one memory including computer program code,
the at least one memory and the computer program code configured to, with the at least one processor, cause the apparatus at least to:
control the reception of a signal as a received signal;
receive as an input the received signal comprising a given number N of diversity branches;
divide the received signal into a predetermined number of signal streams comprising the same information, comprising:
divide the received signal into M streams each comprising the N diversity branches, where N and M are positive integers;
apply a linear process to the diversity branches of each signal stream, the processes having different frequency characteristics for each stream; and
apply a shared interference rejection over the N times M diversity branches of the signal streams, comprising apply in the interference rejection a (N×M)×(N×M) noise whitening matrix to the diversity streams.

9. The apparatus of claim 8, wherein the linear processes are filters and a different filter is applied to each signal stream.

10. The apparatus of claim 8, wherein the linear processes are one of nonorthogonal and orthogonal to each other.

11. The apparatus of claim 8, wherein the apparatus is one of a base station transceiver, a user terminal, and a GSM (Global System for Mobile Communications) transceiver.

12. An apparatus, comprising:
at least one processor; and
at least one memory including computer program code,
the at least one memory and the computer program code configured to, with the at least one processor, cause the apparatus at least to:
control the reception of a signal as a received signal;
receive as an input the received signal comprising a given number N of diversity branches;

divide the received signal into a predetermined number of signal streams comprising the same information, comprising:
  divide the received signal into M streams each comprising the N diversity branches, where N and M are positive integers;
  divide the received signal to signal streams by generating M copies to the received signal;
apply a linear process to the diversity branches of each signal stream, the processes having different frequency characteristics for each stream, comprising:
  shift each stream with a different frequency offset;
  apply a filter to each stream; and
  rotate each filtered stream; and
apply a shared interference rejection over the N times M diversity branches of the signal streams, comprising apply the shared interference rejection to the rotated streams.

13. The apparatus of claim 12, wherein the linear processes are one of nonorthogonal and orthogonal to each other.

14. The apparatus of claim 12, wherein the apparatus is one of a base station transceiver, a user terminal, and a GSM (Global System for Mobile Communications) transceiver.

15. A method, comprising:
controlling the reception of a signal as a received signal;
receiving as an input the received signal comprising a given number N of diversity branches;
dividing the received signal into a predetermined number of signal streams comprising the same information, comprising:
  dividing the received signal into M streams each comprising the N diversity branches, where N and M are positive integers;
applying a linear process to the diversity branches each signal stream, the processes having different frequency characteristics for each stream;
applying a shared interference rejection over the N times M diversity branches of the signal streams, comprising applying in the interference rejection a (N×M)×(N×M) noise whitening matrix to the diversity streams.

16. The method of claim 15, wherein the linear processes are filters, the method further comprising: applying a different filter to each signal stream.

17. The method of claim 15, wherein the linear processes are one of nonorthogonal and orthogonal to each other.

18. A method, comprising:
controlling the reception of a signal as a received signal;
receiving as an input the received signal comprising a given number N of diversity branches;
dividing the received signal into a predetermined number of signal streams comprising the same information, comprising:
  dividing the received signal into M streams each comprising the N diversity branches, where N and M are positive integers; and
  dividing received signal to signal streams by generating M copies to the received signal;
applying a linear process to the diversity branches each signal stream, the processes having different frequency characteristics for each stream, comprising:
  shifting each stream with a different frequency offset;
  applying a filter to each stream; and
  rotating each filtered stream;
applying a shared interference rejection over the N times M diversity branches of the signal streams, comprising applying the shared interference rejection to the rotated streams.

19. The method of claim 18, wherein the linear processes are one of nonorthogonal and orthogonal to each other.

* * * * *